United States Patent [19]

Miller

[11] Patent Number: 4,885,219
[45] Date of Patent: Dec. 5, 1989

[54] ROTATABLE STORAGE COMPARTMENT FOR BATTERIES AND THE LIKE

[75] Inventor: Timothy C. Miller, Greenwood, Ind.

[73] Assignees: American Telephone and Telegraph Company, New York, N.Y.; AT&T Information Systems Inc., Morristown, N.J.

[21] Appl. No.: 274,161

[22] Filed: Nov. 21, 1988

[51] Int. Cl.$^4$ .............................................. H01M 2/10
[52] U.S. Cl. ................... 429/99; 206/45.15; 206/333
[58] Field of Search ....................... 429/96, 97, 98, 99, 429/100; 206/333, 315.11, 45.15

[56] References Cited

U.S. PATENT DOCUMENTS

| | | | |
|---|---|---|---|
| 2,199,008 | 4/1940 | Oshei | 206/45.15 |
| 4,230,777 | 10/1980 | Gatto | 429/97 |
| 4,348,715 | 9/1982 | Christensen et al. | 362/109 |
| 4,383,007 | 5/1983 | Murphy | 429/1 |
| 4,391,883 | 7/1983 | Williamson et al. | 429/97 |
| 4,583,774 | 4/1986 | Holden et al. | 292/19 |

Primary Examiner—Donald L. Walton
Attorney, Agent, or Firm—Michael A. Morra

[57] ABSTRACT

An improved storage compartment for batteries and the like is formed by a housing and a compartment door. The housing includes an opening along one edge that is shaped to receive the compartment door. Within the opening are circular supports for holding the compartment door and for permitting rotation of the door into the housing as it is being opened. The compartment door contains a cylindrical shaft at each end thereof for engaging the circular support. When used as a battery compartment, metallic contacts are either mounted in the housing or in the door itself. These contacts make electrical connection with one or more batteries placed into the storage compartment. Within the compartment, batteries are positioned such that the axis around which the compartment door rotates passes through the center of gravity of the batteries.

18 Claims, 3 Drawing Sheets

ROTATABLE STORAGE COMPARTMENT FOR BATTERIES AND THE LIKE

TECHNICAL FIELD

This invention relates to the design of a general utility storage compartment, and more particularly to the construction of a compartment for securing batteries in electronic equipment.

BACKGROUND OF THE INVENTION

In many electronic products, batteries are used for providing primary power, auxiliary power, and even backup power for sustaining memory functions in the event of power failure. Unless these batteries are permanently made part of the electronic product, as is the case with lithium cells in certain low current drain applications, they must be replaced periodically. Storage compartments have been provided to (i) hide batteries that would otherwise be visible and thus detract from overall product appearance and (ii) assist in holding batteries stationary during movement of the product. An example of one such battery compartment is shown in U.S. Pat. No. 4,383,007 which discloses a conventional design using a flat door that snaps on and off to provide access to the batteries stored therein. Unfortunately, such doors frequently become lost during battery replacement due to poor mechanical attachment to the product or beacuse they are misplaced. Furthermore, when the product is dropped, the batteries push against the door in a manner that causes it to open and spill its contents.

Another example of a battery compartment is shown in U.S. Pat. No. 4,391,883 which discloses a door that pivots outwardly to expose its battery. This design, too, is susceptible to having the door detach if the product is dropped. Such doors therefore need to be firmly held in their closed position to withstand the impact of being dropped. This means that the door is either difficult to open or includes an interlock system—a feature which often confuses the user.

A third design of battery compartment is shown in U.S. Pat. No. 4,583,774 and appears to be less susceptible to having the door detach from the associated product when it is dropped. Since the associated door slides open, it may underlap the product along its edges and easily withstand the impact of landing in various orientations. Nevertheless, it is undesirable to physically remove the battery door from the product because it is readily misplaced and is less convenient than a door that remains attached to the product after opening. However, even doors that remain attached are highly susceptible to damage because they project outwardly, are weakly secured, and require that great care be exercised. In general, doors that are easy to open do not hold the batteries securely, while doors that are hard to open are inconvenient to the user.

Accordingly, it is an object of the present invention to provide a storage compartment whose operation is obvious to a user and does not require significant force to open.

It is another object of the present invention that the battery door remain attached to the associated product after opening but not readily susceptible to damage.

It is yet another object of the present invention to securely hold batteries or other objects within the compartment when the product containing the compartment is dropped.

SUMMARY OF THE INVENTION

The present invention is directed to a storage compartment that may be used to hold objects such as batteries and the like. The compartment includes a rotating door that is held captive by an associated equipment housing. The compartment is characterized in that the door rotates into the housing as it is opened. Means are provided to limit the amount of rotation that the door experiences so that it cannot be fully pushed into the housing and thereby become inaccessible to the user who is seeking to close the door. Means are also provided to hold the door closed so as to minimize the possibility of its inadvertent opening.

In one illustrative embodiment, the door includes cylindrical shoulders on either side thereof that rotate on complementary ribs located within the housing. These complementary ribs reside on either side of the opening and cooperate with the shoulders to capture the door within the housing. In this embodiment, battery connection contacts are contained within the housing at opposite ends thereof for connection to one or more cylindrical batteries. Advantageously, the center line of the batteries coincides with the axis of rotation of the storage compartment so that the movements of the housing do not tend to open the door.

In another illustrative embodiment of the invention, the door includes a pivot means, for example, a pin or a hole centered on its axis, at either end thereof that cooperates with a complementary member molded into the housing to hold the door captive while allowing rotation of the door. Either embodiment is suitable for storing a rectangular battery or power cord.

It is a feature of the present invention that the storage compartment may be edge-mounted to preserve space within the housing for electrical circuit boards.

It is another feature of the present invention that the door, in its closed position, is substantially flush with the surface of its associated housing—whether positioned along an edge or on a single surface.

These and other objects and features of the present invention will be more fully understood when reference is made to the associated drawing and detailed description.

DETAILED DESCRIPTION

Figure 1:
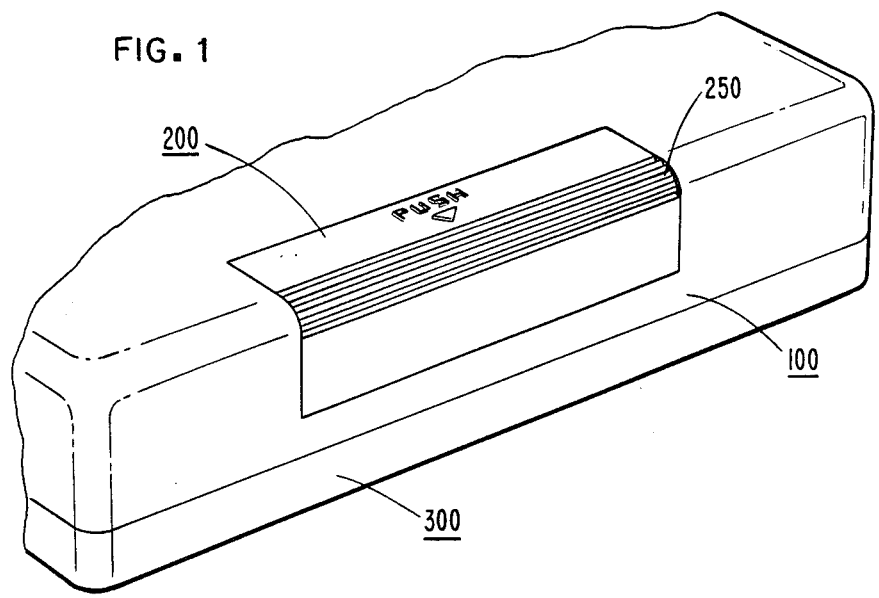
FIG. 1 illustrates a bottom view of a storage compartment in accordance with the invention with its door shown in the closed position.

The present invention is directed to a rotatable compartment for storing batteries or miscellaneous electrical items such as a power cord. Although batteries represent the main application of the invention, it is clear that numerous other uses exist for such a compartment. The compartment comprises a stationary housing and a door that rotates into the housing. It is desirable that the interior of the compartment be hidden from view during ordinary use. FIG. 1 provides a bottom view of the storage compartment with the door closed, so that the interior is, indeed, generally hidden from view. Lower housing member 100 mates with an upper housing member 300 (shown in FIG. 3) to capture door 200. As shown in FIG. 1 the door is generally flush with one or more surface(s) of the lower housing member 100. Here, door 200 is shown in its normally closed position. To facilitate opening, directions may be molded onto the door, as illustrated, and the surface of the door may include horizontal grooves 250. Alternatively, the door may be textured to improve a user's grip during operation. Although such improvements have benefits, they are not required for adequate operation.

Figure 2:
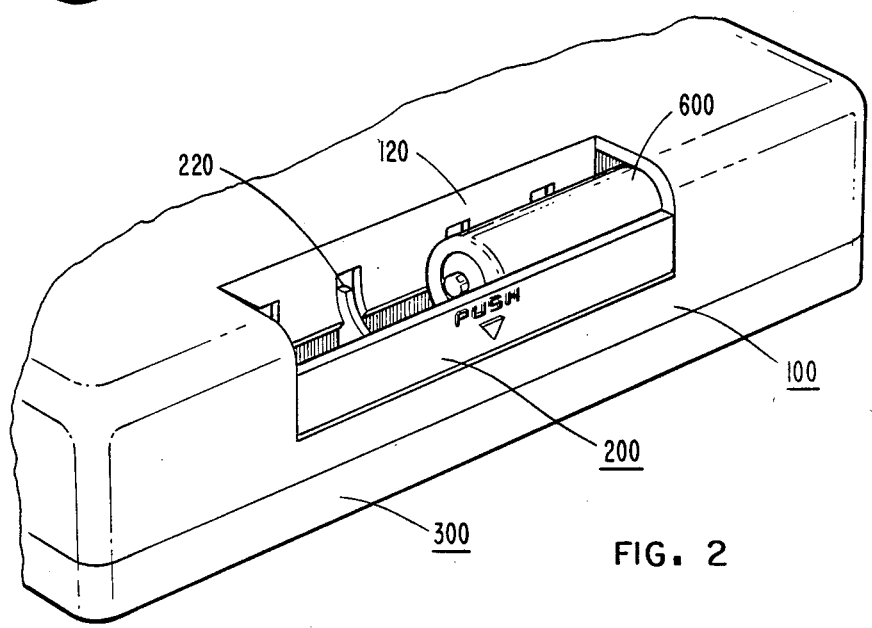
FIG. 2 illustrates a bottom view of the storage compartment with its door shown in the opened position.

FIG. 2 discloses the same bottom view of the storage compartment with the door 200 rotated into its opened position. Battery 600 is shown within the compartment and supported by ribs 220 molded into the door. The ribs 220 cooperate with support plate 120 to hold battery 600 captive in both the opened and closed position of the door. Moreover, door 200 rotates into its opened position without pushing the battery into another position. Although the storage compartment is illustrated with two batteries, it is clear that a single battery, or possibly three or more batteries may be accommodated with only minor modification without departing from the spirit of the invention. Additionally, the rotating door need not be positioned along an edge of the housing, but rather at any convenient location on a flat surface thereof. What is important, however, is that the door rotates into the housing as it is being opened and remains attached to the housing after it is opened. Accordingly, door 200 is unlikely to be broken since it does not materially protrude from being flush with the surface(s) of the housing, and cannot be misplaced since it cannot be easily removed from the housing.

In a preferred embodiment, cylindrical batteries are shown, although a standard 9-volt rectangular battery is easily accommodated by a minor redesign of ribs 220 and support plate 120. Naturally, a battery clip would reside within the compartment and extend via a wire-pair into housing 100 for powering electronic equipment contained therein.

Figure 3:
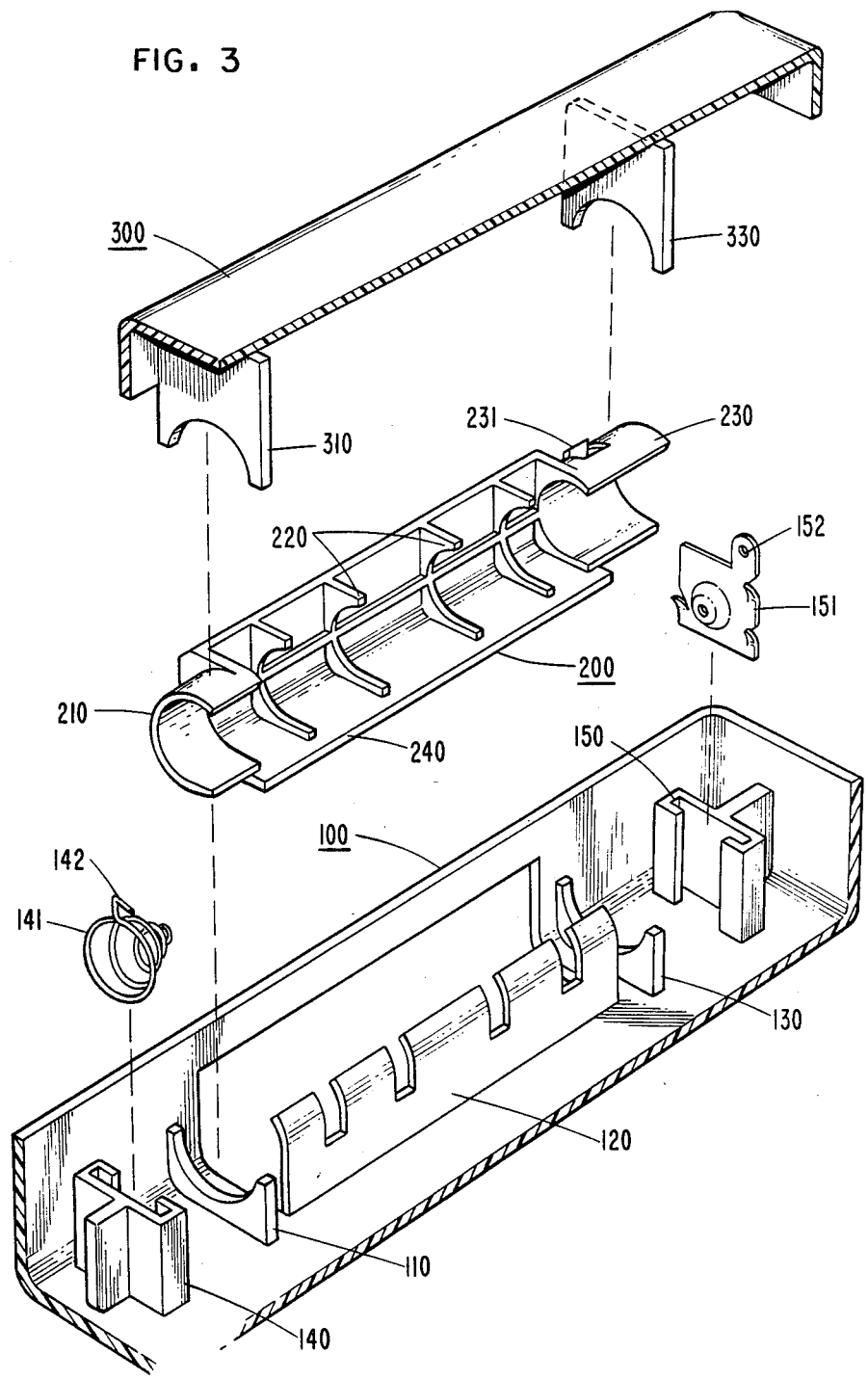
FIG. 3 shows an exploded perspective view of the storage compartment illustrating the details of its construction.

Turning now to FIG. 3, a more detailed view of the entire assembly is disclosed in an exploded perspective view. Here, upper and lower housing members 300, 100 respectively, are shown in their normal upright position; together they capture compartment door 200 within the hollow housing that they form. The design of the housing members 100, 300 and door 200 are adapted to be easily molded from a plastic material such as ABS. "Straight mold pulls" are possible with the design shown in FIG. 3. Not shown in FIG. 3 however, is the particular manner in which housing members 100, 300 are joined. A preferred method of joining the upper and lower housings would be to mold bosses into upper housing member 300 and holes into lower housing member 100 that accommodates screws, visible only from the bottom side of the housing, to hold the upper and lower housing members in close association. Returning to FIG. 3, cylindrical shaft 210 of door 200 is captured within the hollow housing by lower support rib 110 and upper support rib 310. Similarly, cylindrical shaft 230 of door 200 is captured by lower support rib 130 and upper support rib 330. These support ribs not only hold the door in place, but also provide a surface adapted to permit rotation of the door. The door rotates around a fixed center line, or axis, that extends from one side of the storage compartment to the other and terminates in electrically conductive contacts 141, 151 at each end. When one or more batteries are positioned within the compartment, their individual center lines coincide with the axis of the storage compartment. In the event that the housing is dropped or subjected to vibration, the forces tending to open compartment door 200 are substantially canceled by the forces tending to close it. This phenomenon occurs when the storage compartment axis passes through the center of gravity of each battery and is most evident when cylindrical batteries are positioned with their axes of symmetry aligned with the storage compartment axis. It is less evident, but none the less true, when a rectangular battery is used. Therefore, the door need not be so tightly held in its closed position that the user would have to struggle to open it. Indeed, tab 231 molded into door 200 cooperates with a portion of the upper support rib 330 to hold the compartment door closed. It provides positive locking of the door in its closed position, but is adapted to release with a small amount of rotational force. Such a rotational force is not simulated by random vibrations or dropping.

Flexible contact member 141 is a conical spring having a loop 142 for attaching a conductive wire. Contact 141 slides into contact holding member 140 which includes a slot for holding contact 141 captive therein. Similarly contact 151 slides into contact holding member 150 which also includes a slot for holding contact 151 captive. Hole 152 is provided for attaching the conductive wire thereto. Further, contact 151 includes serrations positioned to allow it to readily slide into holding member 150 but hinder its removal therefrom. Contacts 141, 151 are positioned at each end of the compartment's axis in order to facilitate electrical connection with cylindrical batteries placed therein. Rigid support for contact holding members 140, 150 is provided by vertical ribs on the back side thereof. A constant low level pressure is delivered to the ribs by spring 141 and the batteries in mechanical contact therewith. The ribs must be able to withstand a higher impact, however, since the housing may be accidentally dropped in such a manner that a significant force component is created in a direction parallel to the storage compartment axis.

Compartment door 200 includes bottom edge 240 that stops against lower housing member 100 to preclude further rotation of door 200 when being closed. Similarly ribs 220 are adapted to stop against the grooves molded into support pate 120 and thus preclude further rotation of the door 200 when being opened. Obviously, other features may be molded into the door and housing that cooperate to limit the rotational travel of the door in either direction and thus enhance the convenience of the user.

Figure 4:
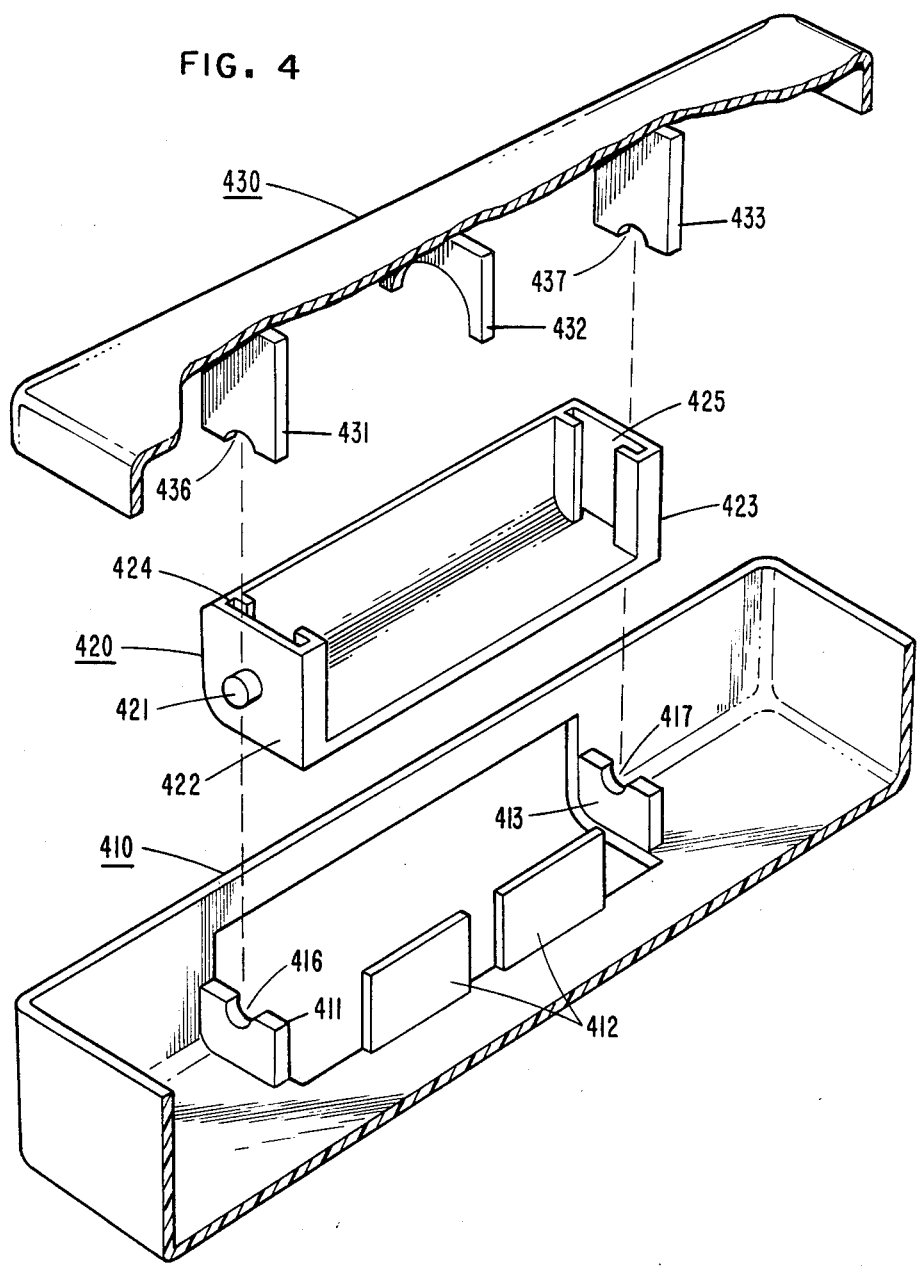
FIG. 4 shows an exploded perspective view of an alternate embodiment of the storage compartment illustrating the details of its construction.

FIG. 4 discloses an alternate embodiment of the present invention in which the compartment door 420 is adapted to fully contain batteries and associated contacts or other objects deposited therein. Compartment door 420 is characterized by sidewalls 422, 423 on opposite sides thereof, each having a cylindrical shaft 421 for rotational attachment to a complementary holding means. Included in the construction of the sidewalls are contact-receiving slots 424–425, molded therein, that hold electrical contacts (not shown) for connection to batteries within the storage compartment. Contacts such as 141, 151 (shown in FIG. 3) are appropriate for use in the embodiment of FIG. 4. When the storage compartment is used as a container for a power cord, contact-receiving slots 424-425 are not necessary. Cylindrical shaft 421 fits into the hole created when lower housing member 410 is joined with upper housing member 430. More particularly, each support rib 411, 431 contains a semicircular opening 416, 436 respectively, that form a circular opening when joined. Cylindrical shaft 421 and circular opening 416, 431 cooperate to assure rotation of the door 420 into the housing 410 and hold the door captive therein in its opened condition. Similarly, support ribs 413, 433 contain semicircular openings 417, 437 respectively, that cooperate to form a circular opening that holds a cylindrical shaft (not shown) molded into the outside of sidewall 423. Lower housing 410 further includes support plates 412, positioned to assist containment of objects placed within the compartment door in its closed condition, and sufficiently spaced apart to accommodate support rib 432, contained in the upper housing 430, when upper and lower housings are joined. The particular method of joining the housings 410, 430 is not of major significance to the invention; nevertheless, the use of bosses molded into the upper housing 430 engaging screws extending upwardly through holes in the lower housing 410 is acceptable. Clearnace is provided between the top surface of upper housing 430 and door 420 to allow contacts (not shown) within slots 424, 425 to extend upwardly for connection to electrically conductive wires.

Although various preferred embodiments are shown and described, it is understood that others are possible within the spirit and scope of the invention. In particular, it is not necessary for the upper and lower housings to cooperate in forming a means for holding the cylindrical shaft 421 (FIG. 4), or 210 (FIG. 3), of the door. Such holding means might be fully contained in either the upper or lower housings. Additionally, rather than locating the shaft on the door and locating the circular opening (which receives the cylindrical shaft) in the housing, these may be reversed. And finally, the compartment need not be located along an edge of the housing but could easily be positioned anywhere on the housing surface.

I claim:

1. Apparatus for storing batteries and the like comprising:
   a housing including an outside surface for enclosing objects therein, the surface having an opening for receiving one or more of said objects, the housing further including means for supporting a compartment door; and
   a compartment door including shaft means positioned on opposite sides thereof for engaging the supporting means within the housing, the supporting means and the shaft means being shaped to permit rotation of the compartment door around an axis of rotation within the housing and to hold the door captive within the housing when the compartment door is opened.

2. The combination of claim 1 wherein the housing comprises an upper housing member and a lower housing member, said housing members each including semicircular ribs that form the supporting means for holding said compartment door, and wherein the shaft means comprises a generally circular member that rotatably engages the semicircular ribs of the upper and lower housing members.

3. The combination of claim 2 wherein the lower housing member further includes a pair of electrical contacts positioned on opposite sides of the opening and centered on the axis of rotation for making electrical contact with a battery inserted in the opening, the battery being positioned with its center of gravity coincident with said axis of rotation.

4. The combination of claim 1 wherein the housing includes a wall member on each side of the opening, each wall member having a circular opening therein that forms the supporting means, the compartment door having a sidewall at each end thereof that includes a protrusion which engages each circular opening and forms the shaft means.

5. The combination of claim 4 wherein each sidewall of the compartment door further includes a slot for receiving a metallic contact, said metallic contact being adapted to make electrical connection with a terminal of a battery placed within the compartment door.

6. The combination of claim 4 wherein the housing comprises an upper housing member and a lower housing member, said members each including a semicircular opening such that when the upper and lower housing members are joined, a circular opening is formed for holding said protrusion in the sidewall of the compartment door.

7. The combination of claim 1 wherein the housing further includes a plate on at least one side of the opening, said plate being substantially perpendicular to the outside surface of the housing and cooperating with the compartment door to contain objects placed therein.

8. Apparatus for storing batteries and the like comprising:
   a housing having an outside surface for enclosing electrical equipment, the surface including an opening therein for receiving a plurality of series-connected cylindrical batteries, said batteries lying along a single straight line that is parallel to the outside surface and extends from one side of the opening to the other;
   a pair of metallic contacts, positioned within the housing on opposite sides of the opening and centered on said single straight line, for making electrical contact with the series-connected cylindrical batteries; and
   a door member including shaft means on opposite sides thereof for attachment to shaft receiving means within said opening of the housing, the shaft means and the shaft receiving means being adapted to permit rotation of the door member around said straight line and to hold the door captive within the housing when the door is opened.

9. The combination of claim 8 wherein the housing includes a pair of generally planar surfaces that intersect each other at a predetermined angle, each surface having an opening therein adjacent to the other opening along the intersection, and wherein the door member includes a pair of generally planar surfaces that intersect each other at said predetermined angle, whereby a battery compartment is positioned along an edge of the housing.

10. The combination of claim 8 wherein the shaft means on each of the opposite sides of the door comprises a hollow cylindrical shaft whose inside surface is adapted to accommodate a cylindrical battery placed therein, and whose outside surface rotatably engages a similarly curved surface of the shaft receiving means.

11. Apparatus for storing batteries and the like comprising:
- a housing having an outside surface for enclosing electrical eqiupment therein, said surface including an opening and means for holding a compartment door; and
- a compartment door including walls on opposite ends thereof, said walls being parallel to each other, one side of each wall comprising shaft means for engagement with said holding means, the shaft means and the holding means being adapted to permit rotation of the door member around an axis of rotation and to hold the door captive within the housing when the compartment door is opened.

12. The combination of claim 11 wherein the other side of the each wall comprises a slot for receiving a metallic contact, said metallic contacts being adapted to make connection with one or more batteries stored in the compartment door.

13. The combination of claim 11 wherein the housing comprises an upper housing member and a lower housing member, said housing members each including a pair of support ribs extending therefrom and perpendicular thereto, each support rib having a semicircular indentation at one end positioned such that when the upper and lower housing members are joined together a circular opening is formed, whereby the circular opening forms the holding means.

14. Apparatus for storing batteries and the like comprising a housing and a compartment door, the compartment door being shaped for insertion into an opening of the housing and for covering said opening in its closed position,
- support means positioned within the opening of the housing for holding the compartment door in rotational association with the housing; and
- shaft means positioned on opposite sides of the compartment door for engaging the support means and for allowing the compartment door to rotate into the housing as it is being opened.

15. The apparatus of claim 14 wherein the shaft means and the the support means are substantially cylindrical in shape.

16. The apparatus of claim 15 wherein the shaft means comprises a hollow cylindrical member having an inner diameter suitably large for accommodating a battery therein, the housing being further characterized by a pair of metallic contacts placed within the opening on opposite sides thereof and centered on the axis of rotation of said compartment door, each contact being adapted to make electrical connection with a battery terminal.

17. The apparatus of claim 14 wherein the compartment door is further characterized by a pair of walls positioned on opposite sides of the door, each wall having the shaft means molded into the center of one side thereof, and having a slot for holding a metallic contact molded in the other side thereof.

18. The apparatus of claim 14 wherein the housing includes a pair of generally planar surfaces that intersect each other at a predetermined angle, each surface having an opening therein adjacent to the other opening along the intersection, and wherein the compartment door includes a pair of generally planar surfaces that intersect each other at said predetermined angle, whereby a storage compartment is positioned along an edge of the housing and is generally flush therewith.

* * * * *